Patented June 20, 1950

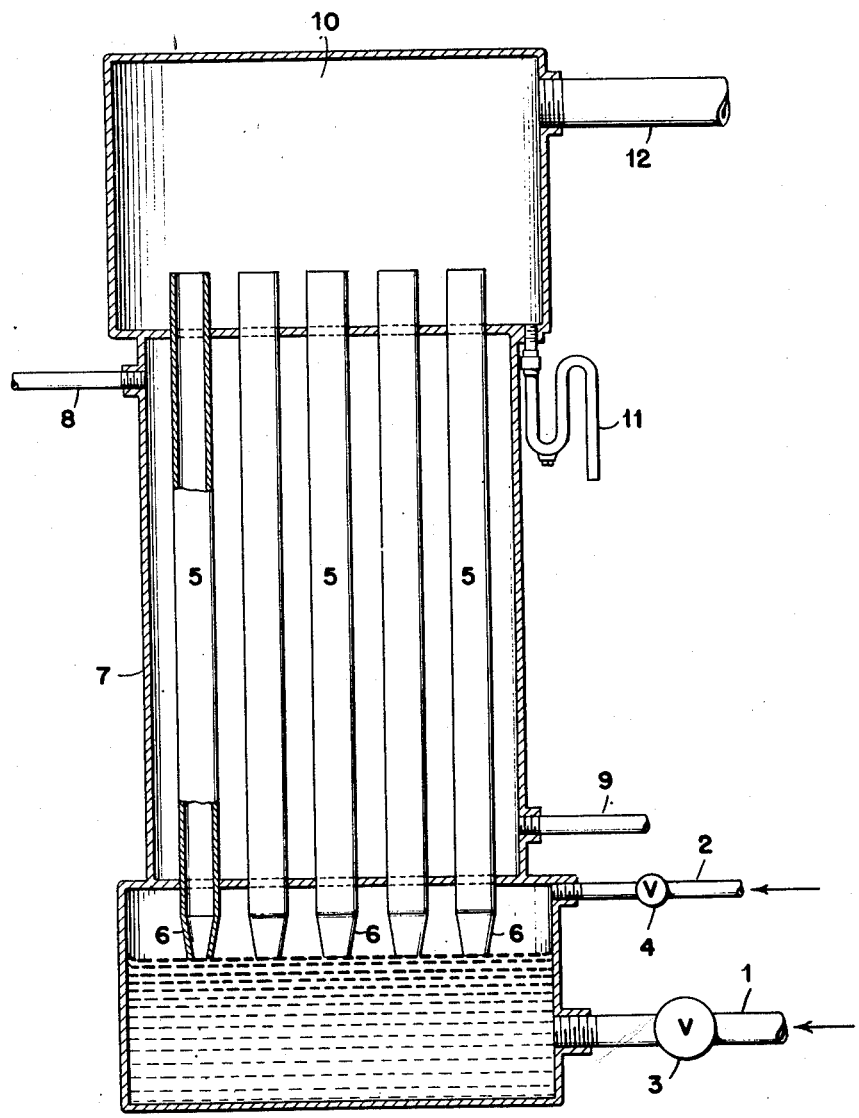

2,511,833

UNITED STATES PATENT OFFICE 2,511,833

METHOD FOR STRIPPING SOLVENTS FROM OILS

Arthur C. Beckel, Peoria, and Paul A. Belter, Pekin, Ill., assignors to United States of America as represented by the Secretary of Agriculture Application May 15, 1945, Serial No. 593,911

1 Claim. (Cl. 261—121)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to the removal of a volatilizable material from a solution of the material and a less volatilizable liquid, in particular the stripping of residual solvents from oils, and is concerned with both a method and apparatus for accomplishing this result.

Although our invention is useful in stripping residual solvent or dissolved gases from extracted oils or oils generally, it is especially useful in removing the residual solvent from vegetable oils, such as soya and castor which are extracted with solvents in large quantities. Various other vegetable oils, animal oils, and petroleum oils which are removed or separated from other materials or other oils by means of solvent extraction may also have their residual solvents removed in accordance with this invention.

The expression "residual solvent," used herein, is intended to include solvents which are not readily removed from an extracted oil by the usual methods, especially in the normal operation of the usual type of evaporator or concentrator apparatus.

The most serious obstacles to the attempt to cause a film of solution to flow over the heated surfaces of strippers of the usual type are the surface forces of the solution which are commonly measured as surface tension. These forces cause the liquid to tend to assume the volume having the smallest possible area and consequently instead of flowing over a surface as a film, it contracts and forms the familiar meandering trickle. This effect may take place wherever and whenever a liquid flows by its own weight over a surface. In the bubble cap column, it will be in the tubes through which the solution passes in flowing down from one plate to the next; in the packed column, it will occur wherever the solution flows over a free surface. It will take place especially on the surface of the tubes in the so-called falling film stripper. In spite of the ingenuity in the design of packing for packed columns, capillarity, which is a manifestation of surface tension, causes quantities of solution to be held wherever surfaces are in close proximity. These quantities are not films.

The present invention obviates these obstacles in that the liquid solution from which the volatilizable material is being removed is caused to spread on the surface in a substantially uniform film, and the period of heating, or rate of movement of the liquid over the surface, is subject to control.

In general, according to the invention the solution of the volatilizable material and less volatilizable liquid is introduced into the bottom portion of a vertical tube, provided with a discharge opening above the place of introduction of the solution. The tube is maintained at a temperature sufficient to cause volatilization of the material without that of the liquid while the solution is spread on the interior surface of the tube. A stripping gas is bubbled through the solution at the bottom portion of the tube at a rate sufficient to cause the solution to spread on the surface, rise along it and the liquid, together with the stripping gas containing the volatilized material, to be ejected from the discharge opening.

Of all the solvents including ethanol, isopropyl alcohol, hexane, ethylene dichloride, carbon tetrachloride, and trichlorethylene, the latter is removed from soybean oil with the greatest difficulty. However, by the use of our invention, we have succeeded in reducing the solvent content of a trichlorethylene solution from 7.0 percent to 0.04 percent. Furthermore, the oil showed no evidences of having been overheated although it is common in practice to overheat oils badly in the attempt to remove the solvent in the usual strippers. The economic advantage in the production of a superior grade of oil is at once apparent.

In the accompanying drawing, there is illustrated an embodiment of the apparatus of our invention in the form of an elevational section view. The solution to be stripped of solvent or gases is introduced into the apparatus through pipe 1. This solution may or may not be preheated. The stripping gas which may be steam, air or any inert gas, such as nitrogen and carbon dioxide, and which may or may not be preheated is introduced through pipe 2. Valves 3 and 4, or other suitable volume metering and control devices for the stripping gas and for the solution are disposed in the pipes 1 and 2, respectively. The flow of stripping gas and solution is adjusted so as to maintain the solution level at the bottom of the stripping tubes 5. It is advantageous for these tubes to be provided with constrictions 6 at the bottom, but such means are not essential to the operation of the stripper. The advantage in having such constrictions is that an immediate spraying is effected of the liquid a short distance up the stripping tubes whereupon the functional upward spreading action begins. This effect is increased with an increase in the diameters of the stripping tubes. A jacket or housing 7 surrounding the tubes 5 is provided with an inlet 8 and an outlet 9 for steam or other heating fluid in order to maintain the temperature of the tubes 5 above the volatilization point of the solvent or other volatile material to be removed. This temperature will, of course, depend on the pressure in the tubes.

With many solutions, the temperature of the stripping gas supplies enough heat energy for the removal of the solvent, and in those cases, the steam jacket is unnecessary, and insulation or lagging for the tubes is all that is needed. Since the continually breaking bubbles in tubes 5 will cause the mechanical entrainment of droplets of fluid, a means of disengagement is necessary. Accordingly, a disengaging chamber 10 is provided above these tubes. A series of baffles or a packed tube (not shown) with a flow-back for the separated fluid would serve the same purpose. The tubes 5 project upward from the bottom of the chamber 10 to permit the stripped oil or other liquid to collect on the bottom which is drawn off through outlet pipe 11. The solvent vapor and stripping gas leave the chamber 10 through pipe 12 which is connected to a vacuum pump and condensing system (not shown).

Having thus described our invention, we claim:

A method of removing a volatilizable material from a solution of the material and a less volatilizable liquid, comprising introducing the solution into the bottom portion of a vertical tube having a discharge opening above the place of introduction of the solution, maintaining the tube at a temperature sufficient to cause volatilization of the material without volatilization of the liquid while the solution is spread on the interior surface of the tube, and bubbling a stripping gas through the solution at the bottom portion of the tube at a rate sufficient to cause the solution to spread as a film on the surface, to rise along the surface, and the liquid to be ejected from the discharge opening.

ARTHUR C. BECKEL.
PAUL A. BELTER.

REFERENCES CITED

The following references are of record in the file of this patent:

UNITED STATES PATENTS

| Number | Name | Date |
| --- | --- | --- |
| 550,853 | Theisen | Dec. 3, 1895 |
| 538,557 | Theisen | Apr. 30, 1895 |
| 1,567,456 | Newton | Dec. 29, 1925 |
| 2,048,179 | Chandler, Jr. | July 21, 1936 |